July 11, 1961 E. BRICHARD 2,991,590
GLASS DRAWING APPARATUS
Filed Feb. 4, 1958 2 Sheets-Sheet 1

INVENTOR
EDGARD BRICHARD
By Corey, Hart & Stemple
ATTORNEYS

July 11, 1961  E. BRICHARD  2,991,590
GLASS DRAWING APPARATUS
Filed Feb. 4, 1958  2 Sheets-Sheet 2

INVENTOR
EDGARD BRICHARD
BY Corey, Hart & Stemple
ATTORNEYS

United States Patent Office 2,991,590
Patented July 11, 1961

2,991,590
GLASS DRAWING APPARATUS

Edgard Brichard, Jumet, Belgium, assignor to Union des Verreries Mecaniques Belges Societe Anonyme, Charleroi, Belgium, a Belgian company
Filed Feb. 4, 1958, Ser. No. 713,128
Claims priority, application Ireland Feb. 19, 1957
14 Claims. (Cl. 49—17)

This invention relates to the manufacture of sheet glass by vertical drawing from the surface of a bath of molten glass and has for an object the production of drawn sheet glass having generally improved physical characteristics.

In the various well known methods of manufacturing sheet glass by vertical drawing, the glass is drawn upwardly from a bath of molten glass in a drawing chamber, the glass sheet emerging from the meniscus formed at the surface of the molten glass. In order to accelerate the setting of the sheet immediately above the meniscus, the vertically drawn sheet of glass is passed between coolers disposed in spaced relation to the opposite faces of the sheet. The coolers are usually in the form of water boxes of rectangular shape and are positioned a short distance above the surface of the molten glass in approximate parallelism to the glass sheet. The coolers accomplish their function by causing the glass sheet to cool by radiation to the coolers. Accordingly, the coolers are disposed in effective relation to the glass sheet to assure the desired cooling by radiation.

According to some of the known methods, the drawn sheet continues upwardly from the drawing chamber into a vertical tower or lehr, at the top of which the rising sheet is cut to appropriate size. In other cases, the drawn sheet is bent over a bending roll located in the drawing chamber and is then advanced through a horizontal lehr, the sheet being cut to appropriate size on its emergence from such horizontal lehr.

The well known methods of vertically drawing sheet glass are the "Fourcault" process, in which the sheet is drawn from glass forced through a slot in the floor of a debiteuse under a hydrostatic head, and the "Pittsburgh" and "Colburn" processes, in which the sheet is drawn directly from the surface of the molten glass. The "Pittsburgh" process differs from the "Colburn" process in the respect that the former employs a draw bar which is submerged in the bath of molten glass below the line of draw to stabilize the position of the meniscus.

In order to make distortion-free sheet glass by vertical drawing, it is necessary to avoid local temperature differences in the glass in the region where the sheet is being formed. The distortion which occurs in a glass sheet that has been subjected to such local temperature differences is in the nature of waves running longitudinally of the rising sheet. Objects viewed through a sheet of glass having such waves are distorted and particularly so when they are viewed through the glass at a sharp angle to the waves.

Many devices have been proposed to the art and are known for assuring the delivery of molten glass of a predetermined thermal homogeneity to the bath surface about the line of draw, but occurrences in the drawing chamber itself have militated against the complete success of such proposals and devices. Generally speaking, one main reason for the lack of continuous thermal homogeneity at the surface of the molten glass to each side of the line of draw, is the tendency for irregular relatively cold convection currents to be set up in the ambient atmosphere within the drawing chamber due to contact of portions of such atmosphere with the coolers located therein. The thus cooled air and any other gases associated therewith have a tendency to flow downwardly from the coolers toward the surface of the molten glass and, due to the chimney effect in the drawing chamber in the vicinity of the glass sheet creating an upwardly flow of gases along the sides of the glass sheet with reduction of the pressure of the ambient atmosphere in the vicinity of the meniscus, such cooler gases will tend to flow downwardly towards the meniscus and onto the plastic glass rising from the meniscus. As the cooled gases are reheated by direct contact with the molten glass in the vicinity of the meniscus they are caused to rise along the sides of the glass sheet because of the natural chimney or flue effect existing in the drawing chamber. The impingement of the cooled gases on the plastic glass rising from the meniscus disturbs the desired uniform rate of cooling which is required across the width of the sheet in order to obtain a distortion-free glass sheet. As a result the glass sheet will have variations in thickness due to the aforesaid wave distortions running parallel to the drawing direction. The nearer the coolers are positioned to the glass sheet being drawn, the greater is the danger to the glass sheet from the downwardly flowing currents of cooled gases.

In an endeavor to prevent the aforesaid downward flow of the convection currents of cooled gases from the coolers to the surface of the molten bath in the vicinity of the meniscus, it has been proposed to provide a source of heat below the coolers so as to re-direct the currents of cooled gases upwardly into the normal stream or upward flow of gases over the surfaces of the glass sheet resulting from the chimney effect existing in the drawing chamber. It will be appreciated however, that such redirection of the currents of cooled gases may result in the re-directed gases coming into contact with the glass sheet at a place spaced above the meniscus. Although the thermal shock to the glass in the sheet from such impact of the cooled gases is not as great as it would have been had the colder gases reached the glass in the vicinity of the meniscus, yet there is unavoidably produced at the area of impact a variation in the rate of cooling across the sheet.

It has also been proposed to prevent the formation of cooled gases about the coolers and thus eliminate the possibility of the formation of convection currents that flow downwardly from the coolers onto the molten glass by directing an upwardly blast of air alongside each face of the cooler. It was found, however, that such forcible air currents tend seriously to disturb the normal convection flow in the drawing chamber by producing uncontrolled reflected colder air streams in the vicinity of the sheet. This condition engenders irregular rates of cooling, impairs any improvement in uniformity of thickness, and sets up stresses in the sheet which become dangerous especially when the sheet is being cut.

It is a primary object of the present invention to prevent the downward flow of currents of cooled gases from the coolers to the surface of the molten glass, or the traveling of such cooled gases to the meniscus, without disturbing the normal convection flow in the drawing chamber or producing harmful effects in the glass being drawn. It is contemplated that this purpose shall be accomplished under a condition of maximum transparency of radiation between the glass sheet and the coolers so as to maintain the desired rate of cooling of the glass in and immediately above the meniscus, and thereby attain the desired rate of cooling to assure the intended thickness and uniformity of thickness for the sheet.

In accordance with the aforesaid object, the present invention comprehends apparatus for vertically drawing glass in sheet form from a body of molten glass in which there are included cooling means, preferably water cooled, located on both sides of the drawn sheet to initiate setting of the sheet above the meniscus by radiation of heat from the glass to the coolers, and foraminous layers of open-work metal elements located adjacent to the coolers and adapted to absorb heat radiated from the molten glass and to create, on both sides of the coolers, continuous supplies of warm air which by its buoyancy rises in contiguity with the surfaces of the coolers, the warm air being supplied in the form of up-drifting layers that are effectively continuous in the direction of the length of the coolers, and between the coolers and the glass, are transparent to radiation from the glass. The layers of warm air so supplied by the open-work metal elements entirely eliminate the possibility of convection currents of cooled gases being set up by contact of ambient gases with the coolers and flowing downwardly to the surface of the molten glass or traveling to the meniscus. The open-work metal elements may be formed from woven metal fabric or formed from apertured sheet material. The open-work metal elements may be suspended by stays carried by the walls of the kiln or may be suspended from the coolers themselves. Where the heat absorbed by the open-work metal elements is found to produce insufficient up-drift of warm air to prevent the formation on the cooler of a cold air boundary layer capable of creating the undesired downwardly flowing convection currents, or where it is desirable that such up-drift should be regulated, auxiliary heat may be imparted to the open-work elements either by electrical means or by gas flames.

In order that a clearer understanding of the invention may be had, reference is now made to the preferred embodiments of the invention illustrated diagrammatically and by way of example in the accompanying drawings, in which like numerals are employed to indicate the same or similar parts throughout and in which:

FIG. 1 is a sectional elevation longitudinally of the extension of a glass melting tank and of the lower part of the superstructure including a drawing chamber and the lower portion of a vertical lehr through which the glass is vertically drawn, the drawing chamber having contained therein coolers associated with open-work metal elements formed from woven metal fabric in accordance with the present invention;

Figure 1:
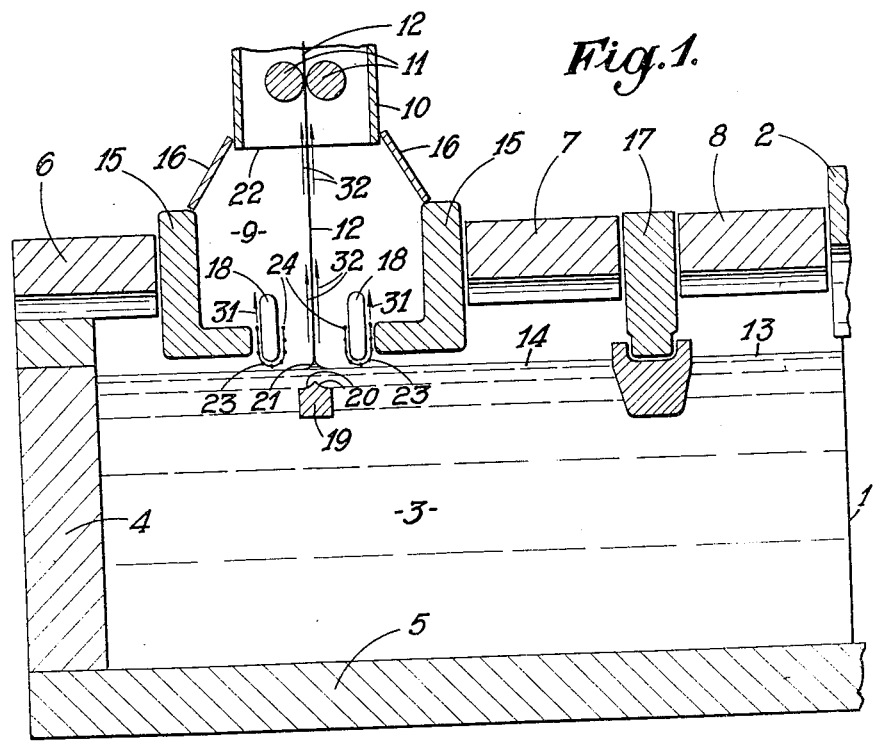

In the drawing tank installation shown in FIG. 1 of the drawings, the end of the glass melting tank is indicated by the numeral 1 and the roof thereof by the numeral 2. The tank is provided with an extension 3 which is closed at its outer end by an end wall 4 and which is constructed on a hearth extension 5. Superimposed over the extension 3 are the usual front element 6, curtain elements 7, and rear roof element 8. Located between the front and curtain elements is the usual drawing chamber 9 which at its upper end opens into a vertical lehr 10. As is customary, the lehr is provided with vertically spaced series of pairs of traction rollers, one pair only of which is illustrated and identified by the reference numeral 11. As is indicated in FIG. 1, the function of the rollers is to draw the glass sheet 12 up from the surface 13 of the body of molten glass 14 in the extension 3, the glass sheet emanating from the meniscus 21 which is formed on the line of draw. The glass sheet 12 is drawn up through the drawing chamber, the walls of which comprise the usual L-blocks 15 and the inclined walls 16 connecting the tops of the L-blocks with the lehr. In the drawing chamber 9 are disposed coolers 18 arranged between the L-blocks 15 and the sheet 12, but constructed in accordance with the invention in a manner which will be hereinafter more fully explained. Between the curtain and rear roof elements 7 and 8, respectively, is disposed the usual tweel 17 for preventing flue gases from the melting tank 1 passing into the extension 3 and reaching the surface of the glass from which the sheet 12 is drawn. To maintain the position of the line of draw, that is to say, the line of generation of the sheet 12, and to assist in regulating the viscosity of the glass reaching the sheet, there is submerged in the molten glass 14 a refractory bar 19 which is usually referred to as a draw-bar. As indicated in FIG. 1 of the drawings, the upper face of the draw-bar may comprise two contiguous concave faces 20 which meet immediately below the line of draw. It will be understood that the draw bar, instead of being a solid refractory bar, may in known manner be slotted medially of its length.

It will be understood from the foregoing that in the operation of apparatus shown in FIG. 1, the sheet 12 is drawn from the surface 13 of the molten glass 14 up into and through the drawing chamber 9 and through the mouth 22 thereof into the lehr 10 in which the glass sheet is annealed. When the sheet emerges from the top of the lehr it is cut to appropriate size in the known manner. As the sheet 12 enters the drawing chamber, it passes between the coolers 18 which accelerate the setting of the sheet immediately above the meniscus 21 by causing heat to pass by radiation from this region of the sheet to such coolers.

Figure 3:
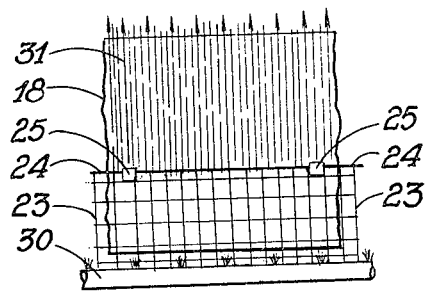
FIG. 3 is a fragmentary side elevation of the parts shown in FIGS. 1 and 2 in which is indicated by arrows the continuous nature of the up-drifting warm air in the direction of the length of the cooler.

In accordance with the present invention, the coolers 18 are each provided with a foraminous partition or screen which is disposed between the cooler and the body of molten glass 14 so that it absorbs heat from the molten glass by radiation and by its contact with ambient air in the drawing chamber produces warm air that by its buoyancy rises in a drifting fashion from the partition, the upward drift of warm air being indicated in the drawings by the reference numeral 31. The foraminous nature of the partition enables the creation of a continuous flow of warm air, and the partition is arranged with relation to the exterior surfaces of its associated cooler so as to cause this continuous up-drift of hot air to rise in contiguity with such exterior surfaces. Further, each partition is constructed and arranged with relation to its associated cooler to produce curtains or layers of up-drifting warm air which are effectively continuous in the direction of the length of such cooler, as is indicated by the arrows 31 in FIG. 3 of the drawings, and which inhibit the formation of a cold boundary layer on the exterior surfaces of the cooler. As a consequence, the cooler cannot cause the creation of convection currents of cooler gases tending to flow downwardly toward the surface 13 of the molten glass. At the same time the required transparency of radiation between the sheet 12 and the coolers 18 is preserved.

A further advantage resulting from the employment of a foraminous partition in accordance with the invention is that it prevents the possibility of localized cooling of the surface of the molten glass below the coolers to any significant extent, and thereby maintains the thermal homogeneity required in the surface of the glass. The intensity of the flow of hot air created by the foraminous partition is never strong enough to create a local pressure reduction of any materiality and such pressure reduction as may be created in the region of the partition is insignificant as compared with the pressure reduction created by the chimney effect, the latter of which is responsible for practically all of the cold air that is normally sucked into the drawing chamber. Thus the provision of these partitions in the apparatus creates no tendency to suck into the drawing chamber a greater quantity of cold air than is normal with the apparatus, nor do they disturb the normal convection flow of the drawing chamber, which is indicated in FIG. 1 of the drawings by the arrows 32.

In the constructions shown in FIGS. 1 to 4 of the drawings the coolers 18 are of the usual water-box type and are provided with foraminous partitions or elements 23 which are hung in a U-shaped fashion around the lower ends of such coolers. The foraminous elements 23 are located adjacent to the exterior surfaces of the coolers and extend longitudinally of the coolers throughout the length of the latter so that the flow of hot air created thereby will be continuous in the direction of the lengths of the coolers. The elements 23 are each composed of woven, open-mesh metal fabric, the openings in the mesh being of such size as to provide sufficient space to permit adequate heat to be radiated from the glass to the coolers to accomplish the desired rate of setting of the glass. When using open-work metal elements in accordance with the invention, satisfactory results will be attained if the size of the openings is less than ½ inch and the wires of the open mesh fabric of a diameter not less than 1/32 of an inch. It will be appreciated that in the showing of the element 23 in FIGS. 3 and 4 of the drawings, the dimensions of the openings thereof have been exaggerated for the sake of clarity of illustration. With wires of the aforesaid diameter, it has been found that the elements will contain sufficient metal to absorb enough heat radiated from the molten glass to heat the neighbouring air by contact to the degree that there is created a layer of warm air on each side of the coolers, which air by its buoyancy causes up-drifting layers thereof to rise in contiguity with the exterior surfaces of the coolers, which layers in the regions between the coolers and the glass are transparent to radiation from the glass.

Figure 2:
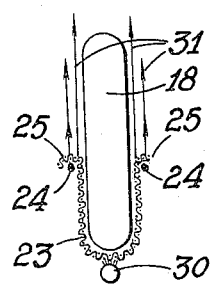
FIG. 2 is an end view of one of the coolers shown in FIG. 1 on an enlarged scale to more clearly illustrate the association of the open-work element with the cooler.
Figure 4:
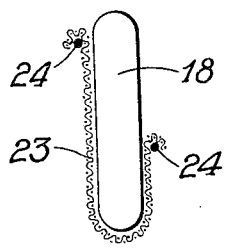
FIG. 4 is a view similar to FIG. 2 showing a modified form of open-work element associated with the cooler, the open-work element of this embodiment extending upwardly for the greater part of the height of the cooler on the cooler face between the cooler and the glass sheet.

The wire mesh elements 23 may be suspended in spaced relation with the coolers by stays 24 supported at each end by the end walls of the drawing chamber. The stays 24 may be supported on the walls of the drawing chamber so that the sides of the elements 23 extend upwardly on the sides of the coolers a substantially equal distance as is illustrated in FIG. 2 of the drawings. Other arrangements of the stays 24 may be made to obtain different dispositions of the elements 23 relative to the coolers. For example, the stays 24 may be so arranged in the drawing chamber that the sides of the elements between the coolers and the glass sheet extend upwardly for the greater part of the height of the cooler, while the other sides of the elements extend upwardly a substantially shorter distance, as is illustrated in FIG. 4 of the drawings.

Figure 7:
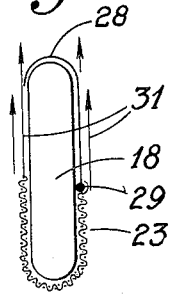
FIG. 7 is another view similar to FIG. 2 showing a woven metal fabric element suspended from the cooler.
Figure 5:
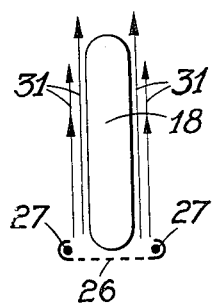
FIG. 5 is a further view similar to FIG. 2 showing the employment of an apertured sheet metal element below the cooler.
Figure 6:
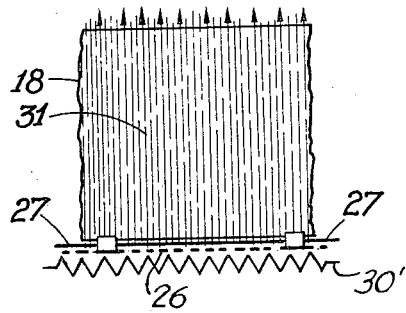
FIG. 6 is a fragmentary side elevational view of the parts shown in FIG. 5.
Figure 8:
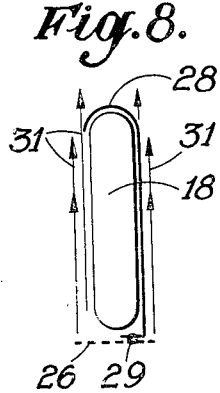
FIG. 8 is a view similar to FIG. 7 showing an associated open-work element of apertured sheet metal suspended from and beneath the cooler.
Figure 9:
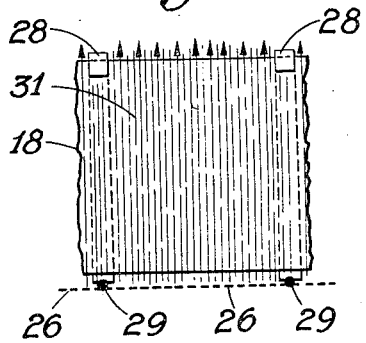
FIG. 9 is a fragmentary side elevation of the arrangement shown in FIG. 8.

Instead of mounting the open-work elements on stays carried by the walls of the chamber 9, the open-work elements may be suspended from the coolers themselves. For example, as shown in FIG. 7 of the drawings, a plurality of hooks 28 hung in spaced relation along the cooler may be joined, e.g., by welding, to one edge of the woven material 23 at the points indicated by 29. The hooks 28 may also depend down to foraminous elements located in horizontal disposed relation beneath the coolers and constituted of apertured sheet metal such as the horizontal open-work element or plate 26 shown in FIGS. 8 and 9 of the drawings, the hooks being riveted or welded to such elements at the places indicated by 29. In order to assure uniform radiation of heat from the glass to the coolers, the hooks are positioned on the coolers so that they depend over those faces of the coolers which are disposed away from the glass sheet 12. Apertured sheet metal elements or plates arranged below the coolers in the manner illustrated in FIGS. 8 and 9, may also be supported by stays carried by the end walls of the drawing chamber 9 in the manner illustrated in FIGS. 5 and 6 of the drawings, wherein 26 designates the foraminous element and the numerals 27 indicate the supporting stays.

In case it is found necessary to provide the open-work elements with more heat than they are capable of absorbing from the molten glass by radiation in order to accomplish the desired results, such elements may be connected as electrical resistance elements in an electric circuit. Moreover, the open-work elements may have heat imparted to them by gas burners so disposed that the flames wipe the outer faces of the open-work elements. In such an arrangement it is preferred that the auxiliary heating means be disposed under the lowermost part of the open-work mesh elements in the manner indicated by the burner 30 shown in FIG. 2 of the drawings and the electrical resistance 30' shown in FIG. 6 of the drawings. Whether the auxiliary heating means is in the form of electrical elements or in the form of gas burners, it should preferably include means well known to the art for regulating the supply of additional heat to the open-work elements to enable the up-drift of the warm air layers to be regulated.

It is believed to be apparent from the foregoing description of the drawings that cooling means constructed in accordance with the present invention effectively prevent the formation of convection currents of cold air about the coolers. Hence conditions are engendered by the means of this invention for obtaining thermal homogeneity at the surface of the molten glass.

Although the construction shown in FIG. 1 of the drawings, illustrates the method of drawing in which a draw-bar is submerged below the line of draw in the body of molten glass, it will be understood that the present invention is not restricted to this exemplification and contemplates the use of coolers such as herein described in connection with other drawing methods, such as when the drawing is effected by using a debiteuse instead of a draw-bar, as in the "Pittsburgh" process, or when neither a draw-bar nor a debiteuse is employed, as in the "Colburn" process. Other modifications can obviously be made in the arrangements described without departing from the spirit of the invention or the scope of the appended claims.

I claim:

1. Apparatus for vertically drawing glass in sheet form from a body of molten glass comprising cooling means located above said body on both sides of the glass sheet being drawn therefrom as to initiate setting of the sheet adjacently above the meniscus by radiation of heat from the glass to said cooling means, said cooling means having a construction tending to create downwardly flowing currents of gases cooled by contact therewith, and means for preventing formation of such downwardly flowing currents comprising metal foraminous means located adjacent to the bottom of said cooling means and extending between such bottom and said glass body so as to absorb heat from the molten glass by radiation and creating by contact with ambient gases a continuous flow of upwardly drifting hot gases rising in intimate contact with the exterior surfaces of said cooling means and in the form of a substantially continuous layer minimizing the tendency of such exterior surfaces of the cooling means to form downwardly flowing currents of cooled gases.

2. Apparatus for vertically drawing glass in sheet form from a body of molten glass comprising cooling means located above said body on both sides of the glass sheet being drawn therefrom as to initiate setting of the sheet adjacently above the meniscus by radiation of heat from the glass to said cooling means, said cooling means having a construction tending to create downwardly flowing currents of gases cooled by contact therewith, and a foraminous metal element located adjacent to the bottom of each cooling means and beneath the latter so as to be positioned between such bottom and said glass body to absorb heat from the molten glass by radiation and to create by contact with ambient gases a continuous flow of upwardly drifting hot gases rising in intimate contact with the exterior surfaces of said cooling means and in the form of a substantially continuous layer minimizing the tendency of such exterior surfaces of the cooling means to form downwardly flowing currents of cooled gases.

3. Apparatus for vertically drawing glass as defined in claim 2, in which said foraminous metal element is composed of woven, open-mesh, metal fabric.

4. Apparatus for vertically drawing glass as defined in claim 2, in which said foraminous metal element is composed of an apertured metal plate.

5. Apparatus for vertically drawing glass as defined in claim 2, in which said foraminous metal element is so constructed and arranged with respect to the bottom and side exterior surfaces of said cooling means that it creates layers of the hot gases on both sides of said cooling means.

6. Apparatus for vertically drawing glass as defined in claim 2, in which said foraminous metal element is substantially flat in form and is disposed substantially horizontally beneath said cooling means.

7. Apparatus for vertically drawing glass defined in claim 2, in which said foraminous metal element has a side portion extending upwardly over one side of said cooling means.

8. Apparatus for vertically drawing glass as defined in claim 7, in which said foraminous metal element has a second side portion extending upwardly over the other side of said cooling means.

9. Apparatus for vertically drawing glass as defined in claim 8, in which said side portions of said foraminous metal element are of unequal height, the side portion of greatest height being located between said cooling means and the glass sheet.

10. Apparatus for vertically drawing glass as defined in claim 2, including stays extending in the direction of the length of said cooling means and carried by the walls of the apparatus, said stays being connected to said foraminous metal element in the direction of the length of said cooling means and supporting said element in depending relation.

11. Apparatus for vertically drawing glass as defined in claim 2, including supporting means carried by said cooling means and connected to said foraminous metal element to support the latter on said cooling means.

12. Apparatus for vertically drawing glass as defined in claim 2, including means to supply said foraminous metal element with heat auxiliary to the heat absorbed by said element from the molten glass by radiation.

13. Apparatus for vertically drawing glass in sheet form from a body of molten glass, comprising cooling means located above said body on both sides of the glass sheet being drawn therefrom, for initiating the setting of the sheet adjacently above the meniscus by radiation of heat from the glass to said cooling means, said cooling means having a construction tending to create downwardly flowing currents of gases cooled by contact therewith, and means for preventing formation of such downwardly flowing currents comprising metal foraminous means located adjacent to the bottom of each cooling means and extending between such bottom and said glass body and between that side of each cooling means facing the glass sheet and the portion of such sheet emerging from said glass body so as to absorb heat radiated from the molten glass and to create by contact with ambient gases, a continuous flow of upwardly drifting hot gases rising in intimate contact with the exterior surfaces of said cooling means and in the form of a substantially continuous layer minimizing the tendency of such surfaces of the cooling means to form downwardly flowing currents of cooled gases.

14. Apparatus for vertically drawing glass in sheet form from a body of molten glass, comprising cooling means located above said body on both sides of the glass sheet being drawn therefrom, for initiating the setting of the sheet adjacently above the meniscus by radiation of heat from the glass to said cooling means, said cooling means having a construction tending to create downwardly flowing currents of gases cooled by contact therewith, and means for preventing formation of such downwardly flowing currents comprising metal foraminous means located adjacent to the bottom of each cooling means and extending between such bottom and said glass body, and between that side of each cooling means facing the glass sheet and the portion of such sheet emerging from said glass body, and over the other side of each cooling means so as to absorb heat radiated from the molten glass and to create by contact with ambient gases, a continuous flow of upwardly drifting hot gases rising in intimate contact with the exterior surfaces of said cooling means and in the form of a substantially continuous layer minimizing the tendency of such surfaces of the cooling means to form downwardly flowing currents of cooled gases.

References Cited in the file of this patent

UNITED STATES PATENTS

| | | |
|---|---|---|
| 1,480,625 | Miller | Jan. 15, 1924 |
| 2,015,773 | Watt | Oct. 1, 1935 |
| 2,693,052 | Brichard | Nov. 2, 1954 |

FOREIGN PATENTS

| | | |
|---|---|---|
| 182,805 | Great Britain | July 19, 1923 |